United States Patent
Adair et al.

(10) Patent No.: US 9,297,266 B2
(45) Date of Patent: Mar. 29, 2016

(54) METHOD OF SEALING COMBUSTOR LINER AND TURBINE NOZZLE INTERFACE

(75) Inventors: David Ronald Adair, Valley Center, CA (US); Walter Ernest Ainslie, Ramona, CA (US); Gordon F. Jewess, San Diego, CA (US); Anthony C. Jones, San Diego, CA (US); Eric J. Alexander, San Diego (CA)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1034 days.

(21) Appl. No.: 13/463,900

(22) Filed: May 4, 2012

(65) Prior Publication Data

US 2012/0242045 A1 Sep. 27, 2012

Related U.S. Application Data

(62) Division of application No. 12/568,615, filed on Sep. 28, 2009, now Pat. No. 8,215,115.

(51) Int. Cl.
| | |
|---|---|
| *F23R 3/50* | (2006.01) |
| *F01D 9/02* | (2006.01) |
| *F01D 11/00* | (2006.01) |
| *F16J 15/08* | (2006.01) |

(52) U.S. Cl.
CPC .............. *F01D 9/023* (2013.01); *F01D 11/003* (2013.01); *F01D 11/005* (2013.01); *F16J 15/0887* (2013.01); *F23R 3/50* (2013.01); *F23R 2900/00012* (2013.01)

(58) Field of Classification Search
CPC ....................................................... F16J 15/164
USPC ............ 60/752–760, 796–800, 772; 277/312, 277/305, 579, 580
See application file for complete search history.

(56) References Cited

U.S. PATENT DOCUMENTS

| | | | |
|---|---|---|---|
| 3,032,990 A | 5/1962 | Rogers | |
| 4,365,470 A | 12/1982 | Matthews et al. | |
| 4,379,560 A * | 4/1983 | Bakken | 277/628 |
| 4,422,288 A * | 12/1983 | Steber | 60/800 |
| 4,466,240 A | 8/1984 | Miller | |
| 4,635,332 A | 1/1987 | Cederwall et al. | |
| 4,767,267 A * | 8/1988 | Salt et al. | 415/173.7 |
| 5,074,748 A * | 12/1991 | Hagle | 415/170.1 |

(Continued)

FOREIGN PATENT DOCUMENTS

| | | |
|---|---|---|
| JP | 2004012655 A | 1/2004 |
| JP | 2004198809 A | 7/2004 |

(Continued)

OTHER PUBLICATIONS

Office Action dated Jan. 24, 2013 in U.S. Appl. No. 13/584,515.

(Continued)

*Primary Examiner* — Phutthiwat Wongwian
*Assistant Examiner* — Rene Ford
(74) *Attorney, Agent, or Firm* — Carlson, Gaskey & Olds, P.C.

(57) ABSTRACT

An example method of sealing an interface within a gas turbine engine includes holding a sealing ring arrangement relative to a turbine nozzle using a flange extending from a combustor liner. The method further includes urging the sealing ring arrangement toward a sealed relationship with the turbine nozzle.

19 Claims, 5 Drawing Sheets

(56) References Cited

U.S. PATENT DOCUMENTS

| | | | |
|---|---|---|---|
| 5,117,637 | A | 6/1992 | Howell et al. |
| 5,118,120 | A | 6/1992 | Drerup et al. |
| 5,265,412 | A * | 11/1993 | Bagepalli et al. ............... 60/800 |
| 5,291,732 | A | 3/1994 | Halila |
| 5,373,694 | A | 12/1994 | Clark |
| 6,199,871 | B1 | 3/2001 | Lampes |
| 6,314,739 | B1 | 11/2001 | Howell et al. |
| 6,347,508 | B1 | 2/2002 | Smallwood et al. |
| 6,397,603 | B1 * | 6/2002 | Edmondson et al. ........... 60/753 |
| 6,418,727 | B1 | 7/2002 | Rice et al. |
| 6,547,257 | B2 | 4/2003 | Cromer |
| 6,588,214 | B2 | 7/2003 | Mack et al. |
| 6,644,034 | B2 | 11/2003 | Ariyoshi et al. |
| 6,854,738 | B2 * | 2/2005 | Matsuda et al. ............... 277/632 |
| 6,880,341 | B2 | 4/2005 | Parkman et al. |
| 6,895,757 | B2 | 5/2005 | Mitchell et al. |
| 6,910,853 | B2 * | 6/2005 | Corman et al. ............... 415/136 |
| 6,988,369 | B2 | 1/2006 | Conete et al. |
| 7,134,286 | B2 | 11/2006 | Markarian et al. |
| 7,140,189 | B2 | 11/2006 | Markarian et al. |
| 7,185,432 | B2 * | 3/2007 | Swaffar ........................ 29/889.1 |
| 2002/0184892 | A1 * | 12/2002 | Calvez et al. .................... 60/796 |
| 2004/0154303 | A1 * | 8/2004 | Mitchell et al. ................. 60/772 |
| 2005/0120718 | A1 * | 6/2005 | Markarian et al. .............. 60/800 |
| 2006/0137351 | A1 * | 6/2006 | Rathmann ....................... 60/752 |
| 2008/0053107 | A1 | 3/2008 | Weaver et al. |
| 2008/0166233 | A1 | 7/2008 | Johnson et al. |
| 2011/0179804 | A1 * | 7/2011 | Nager ............................. 60/796 |

FOREIGN PATENT DOCUMENTS

| | | |
|---|---|---|
| TW | 337576 | 8/1998 |
| TW | 522370 B | 3/2003 |

OTHER PUBLICATIONS

First Office Action dated Nov. 20, 2012 in Japanese patent application No. 2011-022660.

Office Action dated Dec. 17, 2012 in Taiwanese patent application No. 094130886.

* cited by examiner

METHOD OF SEALING COMBUSTOR LINER AND TURBINE NOZZLE INTERFACE

CROSS-REFERENCE TO RELATED APPLICATIONS

The application is a divisional of U.S. patent application Ser. No. 12/568,615, which was filed Sep. 28, 2009 now U.S. Pat. No. 8,215,115, and is incorporated herein by reference.

STATEMENT REGARDING FEDERALLY SPONSORED RESEARCH OR DEVELOPMENT

This invention was made with government support under Contract No. N00019-06-C-0081 awarded by the United States Navy. The Government therefore may have certain rights in this invention.

BACKGROUND

This application relates generally to sealing an interface in the combustor section of a gas turbine engine.

Gas turbine engines are known and typically include multiple sections, such as a inlet section, a compression section, a combustor section, a turbine section, and an exhaust nozzle section. The inlet section moves air into the engine. The air is compressed in the compression section. The compressed air is mixed with fuel and is combusted in combustion areas within the combustor section. The products of the combustion are expanded through the turbine section to rotatably drive the engine.

The combustor section of the gas turbine engine typically includes a combustor liner that establishes combustion areas within the combustor section. The combustion areas extend circumferentially around a centerline of the engine. The combustion areas in a can combustor are separated from each other. The combustion areas in an annular combustor are connected. Turbine nozzles direct the products of combustion from the combustion area to the turbine section in both types of combustors. Substantial leaks at the interfaces between the turbine nozzles and the combustion chambers can cause irregularities in temperature and pressure. The irregularities can reduce the usable life of the turbine nozzles, turbine wheels and other components. Some leakage may be acceptable if the leakage is predictable and relatively uniform.

SUMMARY

An example method of sealing an interface within a gas turbine engine includes holding a sealing ring arrangement relative to a turbine nozzle using a flange extending from a combustor liner. The method further includes urging the sealing ring arrangement toward a sealed relationship with the turbine nozzle.

An example method of sealing a gas turbine engine interface includes holding a sealing ring arrangement against a turbine nozzle using a flange, and urging the sealing ring arrangement against the turbine nozzle to seal an interface between the turbine nozzle and a combustor liner.

These and other features of the example disclosure can be best understood from the following specification and drawings, the following of which is a brief description:

DETAILED DESCRIPTION

Figure 1:
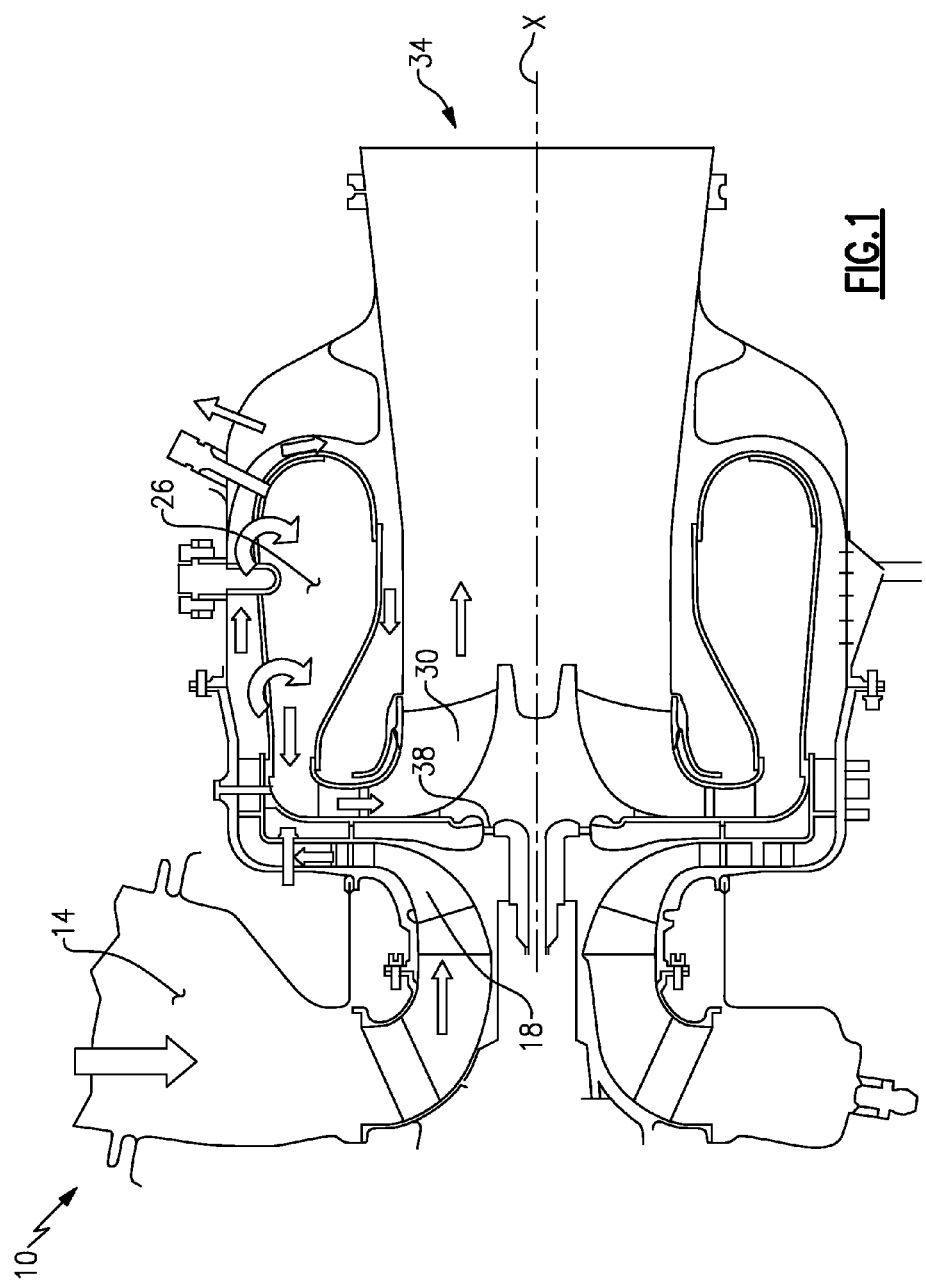
FIG. 1 is a sectional schematic view of an example gas turbine engine.

FIG. 1 schematically illustrates an example gas turbine engine 10 including (in serial flow communication) an inlet section 14, a centrifugal compressor 18, a combustion section 26, a turbine wheel 30, and a turbine exhaust 34. The gas turbine engine 10 is circumferentially disposed about an engine centerline X. During operation, air is pulled into the gas turbine engine 10 by the inlet section 14, pressurized by the compressor 18, mixed with fuel, and burned in the combustion section 26. The turbine wheel 30 extracts energy from the hot combustion gases flowing from the combustion section 26.

In a radial turbine design, the turbine wheel 30 utilizes the extracted energy from the hot combustion gases to power the centrifugal compressor 18. The examples described in this disclosure are not limited to the radial turbine auxiliary power unit described and may be used in other architectures, such as a single-spool axial design, a two spool axial design, and a three-spool axial design. That is, there are various types of engines that could benefit from the examples disclosed herein, which are not limited to the radial turbine design shown.

Figure 2:
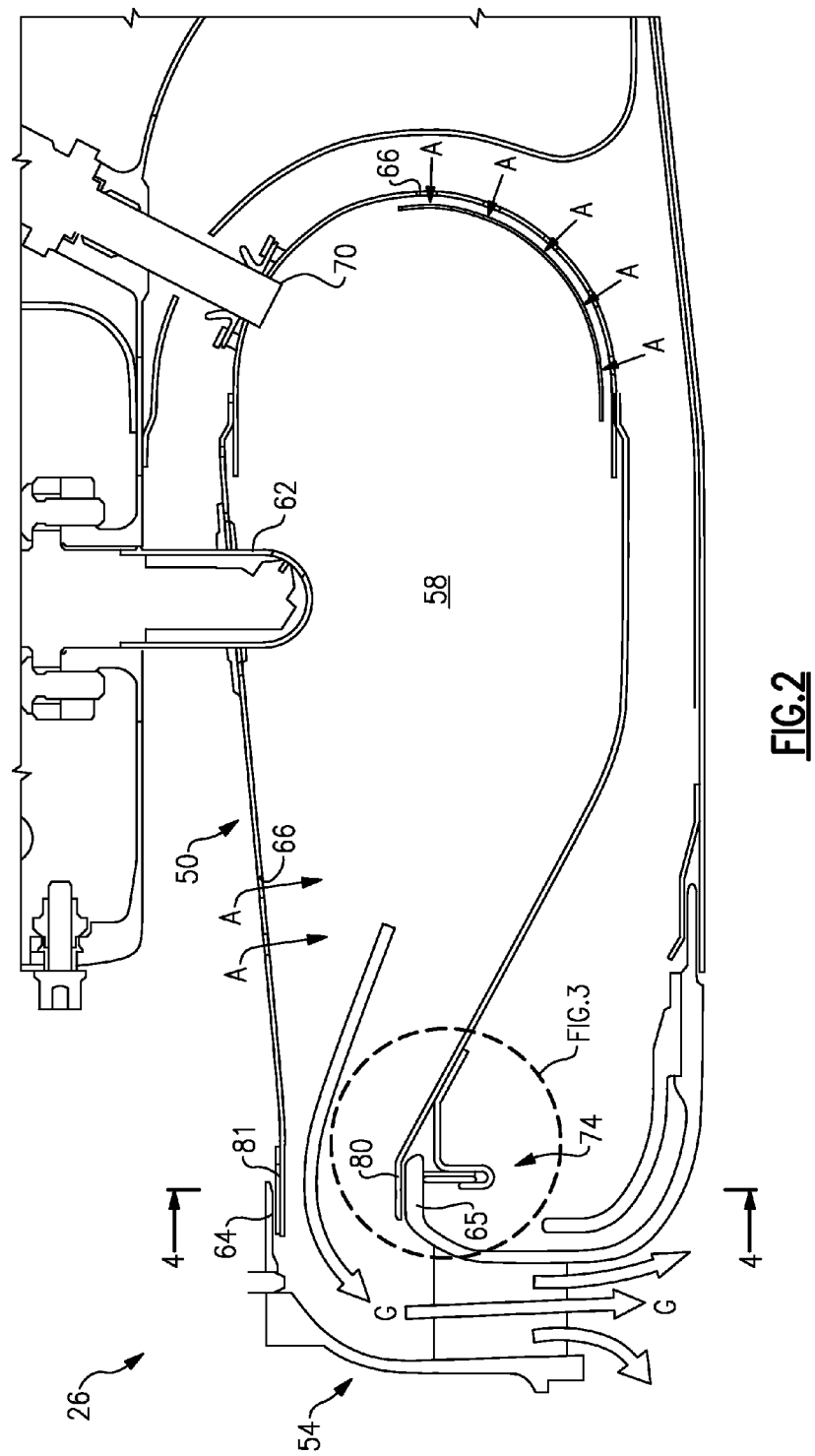
FIG. 2 is a sectional side view of a portion of the combustor section in the FIG. 1 engine.
Figure 3:
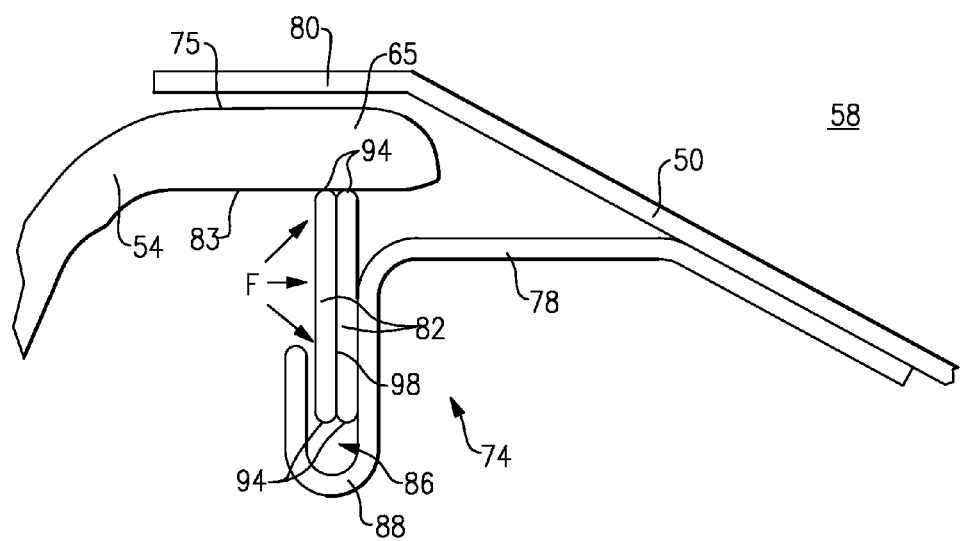
FIG. 3 is a close up view of area 3 in the FIG. 2 combustion section.
Figure 4:
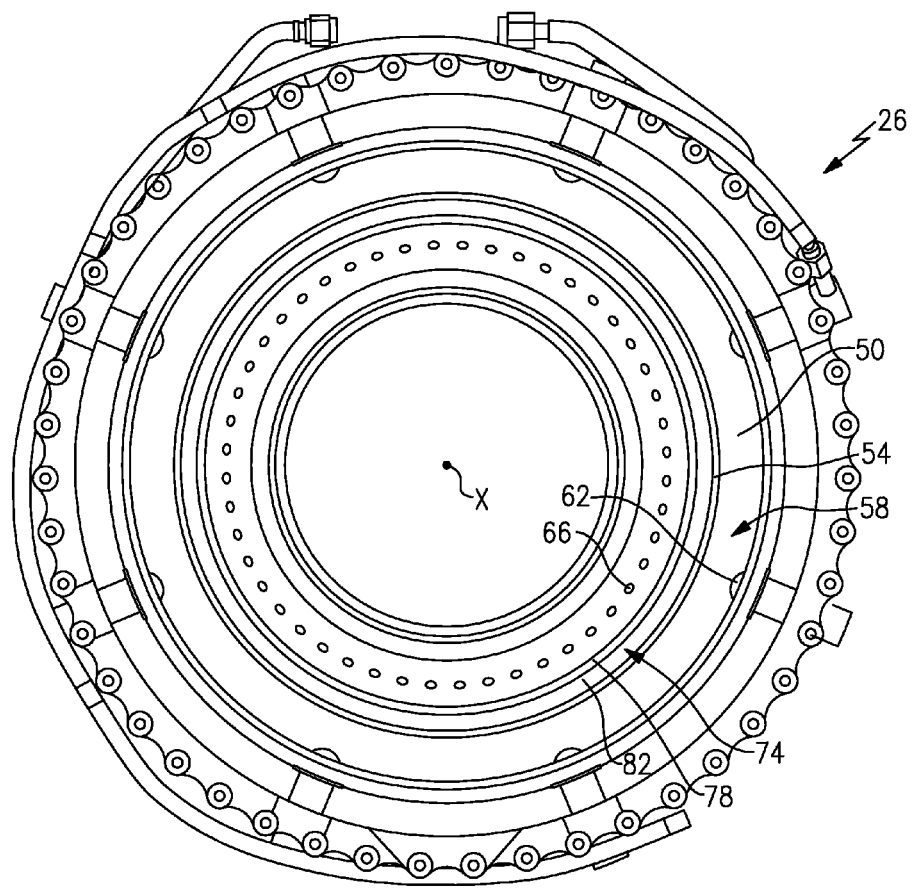
FIG. 4 is a sectional view of the combustor section in the FIG. 1 engine at line 4-4 of FIG. 2.

Referring to FIGS. 2-4 with continuing reference to FIG. 1, within the combustion section 26 of the engine 10 an example combustor liner 50 is secured relative to a turbine nozzle 54. The combustor liner 50 establishes a combustion area 58. A fuel nozzle 62 is configured to spray fuel into the combustion area 58. Air is delivered to the combustion area 58 through apertures 66 in the combustion liner 50. As known, the air pressure within the combustion area 58 is less than the air pressure outside the combustion area 58.

An igniter 70 ignites a mixture of fuel and air within the combustion area 58 to generate hot combustion gases G that are forced through the turbine nozzle 54. The hot combustion gases G drive turbine wheel 30.

In this example, eight fuel nozzles 62 are circumferentially arranged about the engine centerline X. The fuel nozzles 62 are arranged such that the spray pattern of fuel from one of the fuel nozzles 62 slightly overlaps the spray pattern of fuel from an adjacent one of the fuel nozzles 62. Arranging the fuel nozzles 62 in this manner facilitates evenly driving the turbine wheel 30 with the hot combustion gas G moving through the turbine nozzle 54.

The combustor liner 50 and the turbine nozzle 54 meet at an interface 74. In this example, the turbine nozzle 54 provides an annular opening that is defined by spaced apart, concentric outer and inner walls 64 and 65. The annular opening of the turbine nozzle 54 is configured to receive inner and outer collar portions 80 and 81 of the combustor liner 50. In this example, the inner and outer collar portions 80 and 81 are placed within the annular turbine nozzle 54 between the outer and inner walls 64 and 65. The inner collar portion 80 is placed adjacent to a radially outer surface 75 of the inner wall 65 in this example.

A flange 78 extends from a radially inward face of the combustor liner 50 and is configured to hold a plurality of axially aligned sealing rings 82, such that the inner wall 65 of the turbine nozzle 54 is positioned radially between the inner collar portion 80 and the sealing rings 82.

In this example, a portion of the flange 78 is secured directly to the combustor liner 50. Welding secures the flange 78 to the combustor liner 50 in this example. Other adhesion techniques are used in other examples. The flange 78 is also formed from a single sheet of material, which, in this example, is the same type of material used to manufacture the combustor liner 50.

Another portion of the flange 78 establishes a channel 86 that facilitates holding the sealing rings 50. In this example, the flange 78 has a J-shaped portion 88 that establishes the channel 86. The sealing rings 82 are not secured directly to the flange 78 in this example and are thus moveable within the channel 86.

In this example the inner collar portion 80, the outer collar portion 81, the outer wall 64, and the inner wall 65 are aligned with the engine centerline X.

The higher air pressure outside the combustion area 58 exerts forces F on the sealing rings 82, which urges the sealing rings 82 against the flange 78 and the turbine nozzle 54 to seal the interface 74. More specifically, the sealing rings 82 are urged against the flange 78 and an inner surface 83 of inner wall 65. In one example, the inner surface 83 is machined to facilitate maintaining the seal with the sealing rings 82.

Figure 5:
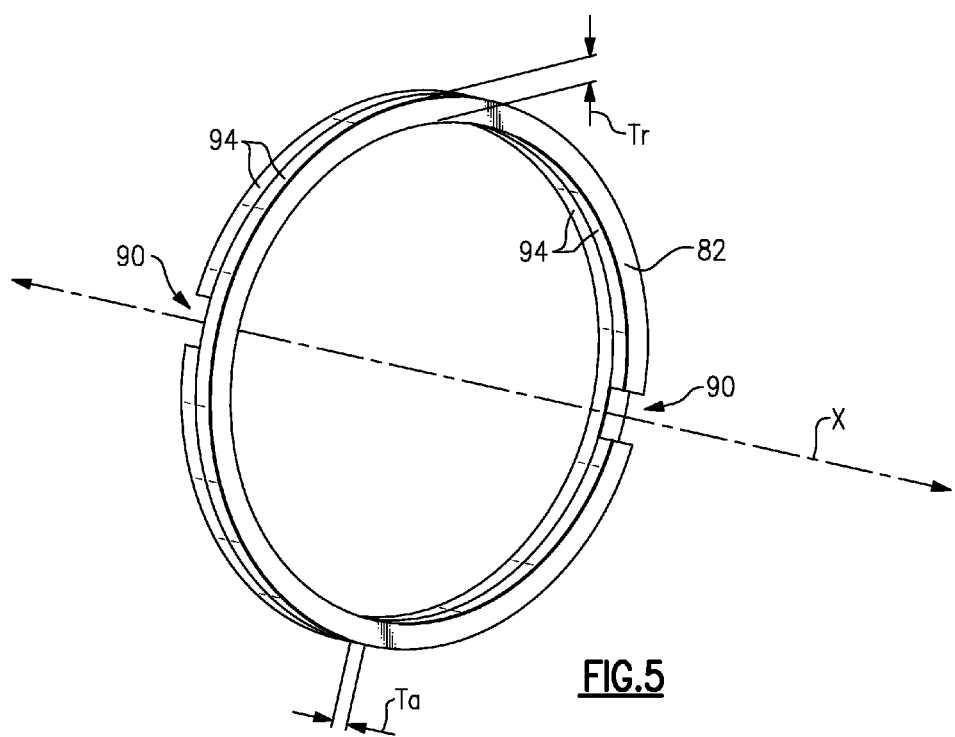
FIG. 5 is a perspective view of the FIG. 2 sealing rings.

Referring to FIG. 5, the example sealing rings 82 have a break 90. That is, the example sealing rings 82 are not continuous rings. As known, the interface 74 is exposed to extreme temperature variations, which can cause the sealing rings 82, and surrounding components, to expand and contract. The break 90 accommodates movements of the sealing rings 82 as the sealing rings 82 expand and contract due to temperature fluctuations within the engine 10. In another example, the sealing rings 82 are a continuous spiral snap ring.

In this example, the break 90 of one of the sealing rings 82 is circumferentially offset from the break 90 of another of the sealing rings 82. Offsetting the breaks in this manner prevents the break 90 from becoming a significant leakage path for air through the interface 74. That is, area of the break 90 in one of the sealing rings 82 is sealed by another of the sealing rings 82.

Two sealing rings 82 are shown in this example. Other examples include using more or fewer sealing rings 82. Five sealing rings 82 may be arranged together, for example. The radially outer and radially inner faces 94 of the example sealing rings 82 are rounded. In this example, the radially outer face facilitates sealing the sealing rings 82 against the turbine nozzle 54. Pointed faces or flattened faces are used in other examples.

In one example, an axially directed face 98 of the sealing rings 82 includes features such as grooves or ribs that limit rotation of the sealing rings 82 relative to each other.

The example sealing rings 82 are made of a carbon-based material. Other examples include sealing rings 82 made of other materials. The example sealing rings 82 have a radial thickness Tr of about 0.25 inches (0.6 cm) and an axial thickness Ta of about 0.08 inches (0.2 cm). The diameter of the example sealing rings 82 is about 12 inches (30.5 cm).

Features of the disclosed examples include using a sealing ring to seal an interface between a combustor and a turbine nozzle. Using the sealing ring facilitates assembly of the interface between the combustor and the turbine nozzle because the sealing ring can be moved relative to the combustor liner. If leaks are found when using the sealing ring, the leaks are typically more predictable and uniform than leaks at interfaces in the prior art designs. Controlled leakage amounts can also be created by the sealing rings. Another feature of disclosed examples includes using breaks in the sealing rings to accommodate expansions and contractions.

Although a preferred embodiment has been disclosed, a worker of ordinary skill in this art would recognize that certain modifications would come within the scope of this invention. For that reason, the following claims should be studied to determine the true scope and content of this invention.

We claim:

1. A method of sealing an interface within a gas turbine engine, comprising:
   a) holding a sealing ring arrangement relative to a turbine nozzle using a flange extending from a combustor liner; and
   b) urging the sealing ring arrangement toward a sealed relationship with the turbine nozzle, wherein a portion of the turbine nozzle is axially overlapped at a common axial position with a portion of the flange relative to a rotational axis of the gas turbine engine, wherein the flange extends from a position axially forward the sealing ring arrangement to a position axially rearward of the sealing ring arrangement.

2. The sealing method of claim 1 including urging the sealing ring arrangement toward a sealed relationship with the flange.

3. The sealing method of claim 1 including securing the flange to a radial inwardly facing portion of the combustor liner.

4. The sealing method of claim 1 including using a pressure differential between a combustion area established by the combustor liner and an area outside the combustion area to urge the sealing ring arrangement.

5. The sealing method of claim 1 wherein the sealing ring arrangement includes a plurality of sealing rings.

6. The sealing method of claim 5 wherein a first break in one of the sealing rings is circumferentially spaced from a second break in another one of the sealing rings.

7. The sealing method of claim 1, including circumferentially offsetting breaks of sealing rings of the sealing ring arrangement.

8. The sealing method of claim 1, wherein the sealing ring arrangement directly contacts the turbine nozzle when in the sealed relationship.

9. The sealing method of claim 8, wherein the sealing ring arrangement directly contacts the flange when in the sealed relationship.

10. The sealing method of claim 1, wherein the turbine nozzle is positioned radially between a portion of the combustor liner and the seal.

11. The sealing method of claim 1, wherein the flange extends from an outer surface of the combustor liner.

12. A method of sealing a gas turbine engine interface, comprising:
   a) holding a sealing ring arrangement against a turbine nozzle using a flange;
   b) urging the sealing ring arrangement against the turbine nozzle to seal an interface between the turbine nozzle and a combustor liner, wherein a portion of the turbine nozzle is axially overlapped at a common axial position with a portion of the flange relative to an axis of the gas turbine engine; and
   c) wherein the flange extends from a position axially forward the sealing ring arrangement to a position axially rearward of the sealing ring arrangement.

13. The sealing method of claim 12, wherein a radially inner face of the sealing ring arrangement contacts the turbine nozzle.

14. The sealing method of claim 12, wherein the flange extends radially outward from the combustor liner.

15. The sealing method of claim 12, wherein a first portion of the sealing ring arrangement seals against the flange and a second portion of the sealing ring arrangement seals against the turbine nozzle.

16. The sealing method of claim 15, wherein the first portion is an axially facing surface, and the second portion is a radially facing surface.

17. The sealing method of claim 1, wherein the portion of the turbine nozzle is axially aligned with a portion of the sealing ring arrangement and a portion of the combustor liner.

18. The sealing method of claim 1, wherein the sealing ring arrangement is supported exclusively by the flange and the turbine nozzle, and the flange is supported by the combustor liner.

19. The sealing method of claim 12, wherein the flange extends from a position axially forward of the sealing ring arrangement to a position axially rearward of the sealing ring arrangement.

* * * * *